US005862501A

United States Patent [19]
Talbot et al.

[11] Patent Number: 5,862,501

[45] Date of Patent: Jan. 19, 1999

[54] GUIDANCE CONTROL SYSTEM FOR MOVABLE MACHINERY

[75] Inventors: Nicholas C. Talbot, Cupertino; Mark E. Nichols, Sunnyvale, both of Calif.

[73] Assignee: Trimble Navigation Limited, Sunnyvale, Calif.

[21] Appl. No.: 946,687

[22] Filed: Oct. 7, 1997

Related U.S. Application Data

[63] Continuation of Ser. No. 516,617, Aug. 18, 1995, abandoned.

[51] Int. Cl.[6] .......... G06G 7/78

[52] U.S. Cl. .......... 701/50; 701/213; 701/215; 701/216; 342/357

[58] Field of Search .......... 701/50, 213, 214, 701/215, 216, 217, 300, 207; 342/352, 357, 457; 340/459, 961; 73/178 R

[56] References Cited

U.S. PATENT DOCUMENTS

| | | | |
|---|---|---|---|
| 4,754,283 | 6/1988 | Fowler | 342/352 |
| 5,334,987 | 8/1994 | Teach | 342/357 |
| 5,361,212 | 11/1994 | Class et al. | 364/460 |
| 5,379,224 | 1/1995 | Brown et al. | 701/215 |
| 5,390,124 | 2/1995 | Kyrtsos | 364/449.9 |
| 5,442,363 | 8/1995 | Remondi | 342/357 |
| 5,442,558 | 8/1995 | Kyrtsos et al. | 364/449.9 |
| 5,452,211 | 9/1995 | Kyrtsos et al. | 364/449.9 |
| 5,493,494 | 2/1996 | Henderson | 364/424.07 |
| 5,504,491 | 4/1996 | Chapman | 364/449.7 |
| 5,519,620 | 5/1996 | Talbot et al. | 364/449.8 |
| 5,526,291 | 6/1996 | Lennen | 364/44.9 |
| 5,543,802 | 8/1996 | Villevieille et al. | 364/449.7 |
| 5,559,520 | 9/1996 | Barzegar et al. | 364/449.7 |
| 5,563,607 | 10/1996 | Loomis et al. | 364/449.7 |
| 5,568,390 | 10/1996 | Hirota et al. | 364/444.1 |
| 5,587,715 | 12/1996 | Lewis | 342/357 |
| 5,594,454 | 1/1997 | Devereux et al. | 342/357 |
| 5,602,741 | 2/1997 | Talbot et al. | 364/449.7 |
| 5,642,285 | 6/1997 | Woo et al. | 701/213 |
| 5,663,732 | 9/1997 | Stangleland et al. | 701/213 |
| 5,686,924 | 11/1997 | Trimble et al. | 342/357 |
| 5,739,785 | 4/1998 | Allison et al. | 342/357 |
| 5,739,787 | 4/1998 | Burke et al. | 701/220 |
| 5,757,646 | 5/1998 | Talbot et al. | 701/215 |

FOREIGN PATENT DOCUMENTS

| | | |
|---|---|---|
| 1834004 | 1/1994 | United Kingdom . |

OTHER PUBLICATIONS

"Dispatch Field Computer System", brochure, Modular Mining Systems (Tucson, AZ) 1995.

"Trimflight GPS Technical Overview", application and technical note, Trimble Naavigation (Sunnyvale, CA) Mar. 1994.

*Primary Examiner*—Jacques H. Louis-Jacques
*Attorney, Agent, or Firm*—Thomas E. Schatzel; Law Offices of Thomas E. Schatzel, A. Prof. Corporation

[57] ABSTRACT

A guidance system for movable machinery comprising a GPS processor unit in a "gorilla box" connected to a shock mounted and protected GPS antenna and an operator display with a lightbar that indicates to an operator of the machinery to steer up/down or left/right.

1 Claim, 2 Drawing Sheets

90
102
display
94
92
100
power in
96
97
98
99
82
84
86
88
118
GPS
UHF
Compass/Tilt
Position Out
lightbar
VGA
function keys
keyboard
power in
104
108
UHF transceiver
microcomputer
114
power supply
110
80
106
GPS receiver
112
power supply
116
over-temp. protector

GUIDANCE CONTROL SYSTEM FOR MOVABLE MACHINERY

This application is a continuation of application Ser. No. 08/516,617 filed on Aug. 18, 1995, now abandoned.

RELATED APPLICATION

Copending U.S. patent application, Ser. No. 08/199,387, filed Feb. 18, 1994, is incorporated herein by reference.

BACKGROUND OF THE INVENTION

1. Field of the Invention

The invention relates generally to automatic guidance systems and more specifically to global positioning system based apparatus for guiding the operation of movable machinery.

2. Description of the Prior Art

Movable machinery such as open-pit mining machines and airplane crop dusters alike can all benefit from decimeter-level accurate global positioning system (GPS) high-precision survey products, e.g., as sold commercially by Trimble Navigation (Sunnyvale, Calif.), and others. But such environments are very hostile, especially to delicate electronic instruments such as land surveying equipment that is usually human-mounted, rather than machine mounted. Earth moving machines are subject to all forms of chemical and mechanical injury. Diesel fuel, hydraulic fluid and even mud slurry can invade every crevice and corner of a machine, and such occurrences are common on a regular basis. Trees, rocks, earth and tools can drop at any time on instruments attached to earth-moving equipment. Engine vibration is severe in such equipment and crop duster airplanes as well.

Equipping such vehicles to benefit from GPS systems involves far more that just mounting an ordinary system to a new platform.

The operation of an airplane, especially in crop dusting service, and the operation of heavy equipment, especially in open pit mines, are far beyond what an automatic control system could pilot unmanned. Therefore, the human operator is still an indispensable part of such activities. It is incumbent then on a guidance system to provide an easy and effective indication of how the machine is deviating from the plan from moment to moment.

SUMMARY OF THE PRESENT INVENTION

It is therefore an object of the present invention to provide a high-precision GPS system in a rugged modular enclosure for use with movable machinery.

Another object of the present invention is to provide a system to improve the productivity of machines used to mine a pit, grade a lot, or spray a field.

It is a still further object of the present invention to provide a simple and effective guidance system for airplane pilots and heavy equipment operators.

Briefly, a system embodiment of the present invention comprises GPS processor unit in a "gorilla box" connected to a shock mounted and protected GPS antenna and an operator display with a lightbar that shows an equipment operator or pilot to steer up/down or left/right.

An advantage of the present invention is a guidance system is provided in a rugged modular set of enclosures for mounting to heavy equipment and airplanes.

Another advantage of the present invention is a guidance is provided that improves the productivity of heavy equipment by the precise guidance of its operators.

A still further advantage of the present invention is a simple and effective guidance system is provided for airplane pilots and heavy equipment operators.

These and other objects and advantages of the present invention will no doubt become obvious to those of ordinary skill in the art after having read the following detailed description of the preferred embodiment which is illustrated in the drawing figures.

IN THE DRAWINGS

DETAILED DESCRIPTION OF THE PREFERRED EMBODIMENT

Figures 1, 2, 3:
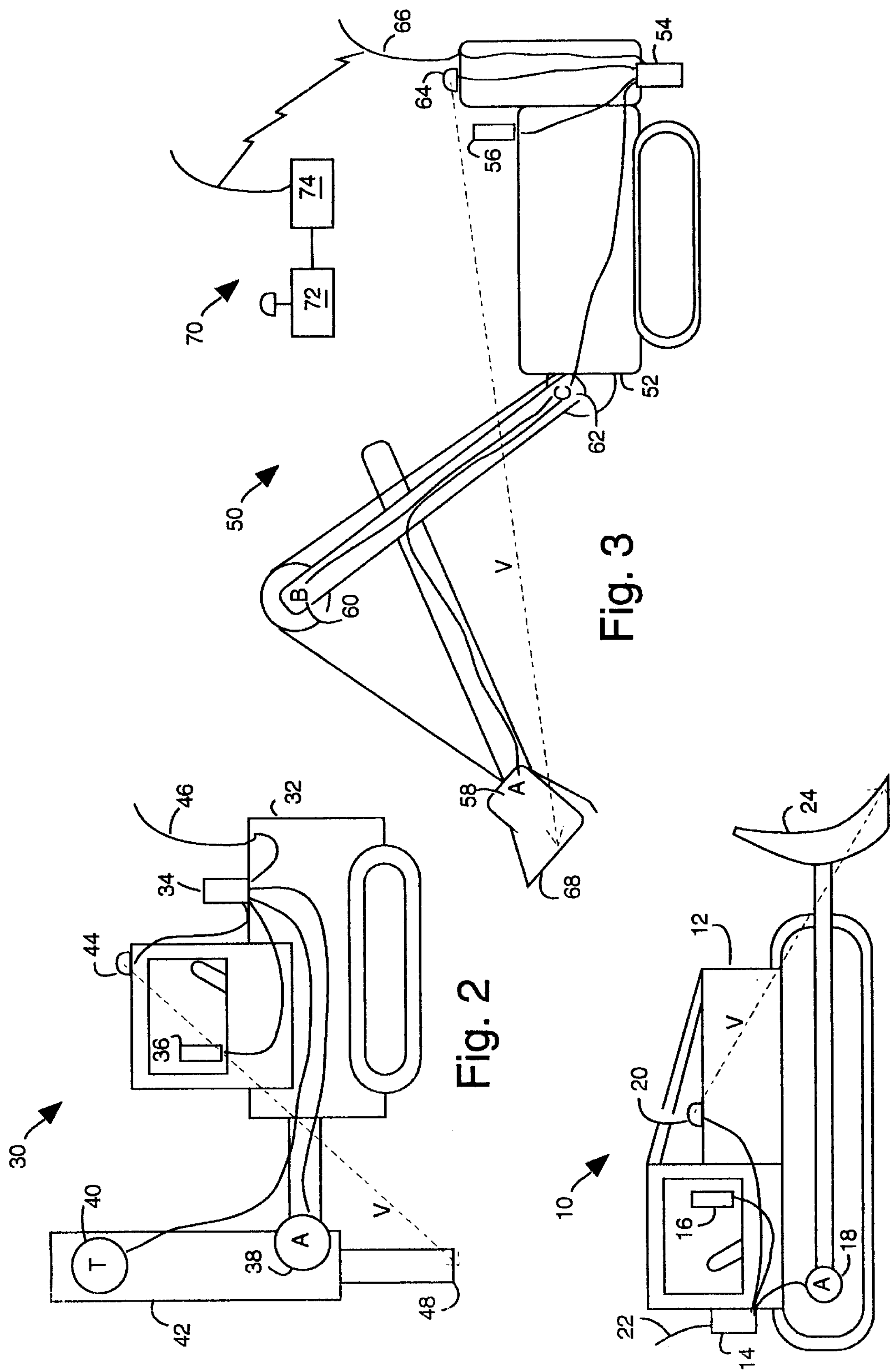
FIG. 1 is a diagram of a guidance system embodiment of the present invention for a bulldozer.
FIG. 2 is a diagram of a guidance system embodiment of the present invention for a pile driver or drill.
FIG. 3 is a diagram of a guidance system embodiment of the present invention for a shovel.

FIG. 1 illustrates a first guidance system embodiment of the present invention, referred to herein by the general reference numeral 10. The system 10 is attached to a bulldozer 12 in a modular arrangement that is preferably easy to install and remove. The system 10 includes a rough-service "gorilla box" 14 that contains a UHF telemetry receiver and a global positioning system (GPS) navigation receiver and processor unit connected to an operator display 16 and a position/angle sensor (A) 18. For example, the UHF receiver and GPS receiver may comprise commercially-available units, e.g., Trimble Navigation (Sunnyvale, Calif.) TRIMTALK 450/900 UHF receiver and SITE SURVEYOR 4000 OEM GPS receiver or model-520 GPS processor unit.

A dual-frequency GPS antenna 20 is placed in a position protected from injury and is provided to receive spread spectrum microwave radio frequency transmissions of time and range from orbiting navigation satellites, e.g., GPS satellites. An antenna 22 provides for the reception of UHF telemetry signals, e.g., differential correction, real-time kinematic, and machine control information. The gorilla box 14 also houses a tilt sensor "T" and a compass. The tilt sensor "T" may be preferably mounted directly on the bulldozer. The GPS processor unit provides centimeter level accurate positions of the antenna 20 in real-time at a frequency sufficient to guide an operator through the display 16. For example, at least once a second the display indicates to the operator to raise or lower the blade. A computer included in the gorilla box 14 computes a vector "V" to a blade 24 from the centimeter level accurate positions together with the tilt "T", the compass direction and angle "A".

FIG. 2 illustrates a second guidance system embodiment of the present invention, referred to herein by the general reference numeral 30. The system 30 is attached to a pile driver 32 in a modular arrangement that is preferably easy to install and remove. The system 30 includes a "gorilla box" 34 connected to an operator display 36 and a position/angle sensor (A) 38. A tilt indicator (T) 40 indicates the inclination of a stem 42. A compass may be located nearby or on the stem 42. A microwave antenna 44 is in a position protected from injury and is provided to receive spread spectrum radio frequency transmissions of time and range from orbiting navigation satellites. An antenna 46 provides for the reception of telemetry signals, e.g., differential correction, real-time kinematic, and machine control. The gorilla box 34 houses a compass, if not otherwise provided, and a navigation satellite receiver, e.g., a global positioning system (GPS) unit as manufactured by Trimble Navigation (Sunnyvale, Calif.). As in system 10, such GPS unit provides centimeter level accurate positions of the antenna 44 in real-time at a frequency sufficient to guide an operator through the display 36. For example, at least once a second the display indicates to the operator to reposition or tilt the stem 42. A computer included in the gorilla box 34 computes a vector "V" to a work end 48 from the centimeter level accurate positions together with the tilt "T", the compass and angle "A".

FIG. 3 illustrates a third guidance system embodiment of the present invention, referred to herein by the general reference numeral 50. The system 50 is attached to a shovel 52 in a modular arrangement that is preferably easy to install and remove. The system 50 includes a "gorilla box" 54 connected to an operator display 56 and a trio of position/angle sensors (A) 58, (B) 60 and (C) 62. Such sensors may include optical shaft encoders. A microwave antenna 64 is in a position protected from injury and is provided to receive spread spectrum radio frequency transmissions of time and range from orbiting navigation satellites. An antenna 66 provides for the reception of telemetry signals, e.g., differential correction, real-time kinematic, and machine control from ground-based reference stations. The gorilla box 54 is connected to a separately-mounted compass and a tilt meter, and houses a navigation satellite receiver, e.g., a global positioning system (GPS) unit as manufactured by Trimble Navigation (Sunnyvale, Calif.). As in system 10, such GPS unit provides centimeter level accurate positions of the antenna 64 in real-time at a frequency sufficient to guide an operator through the display 56. For example, at least once a second the display indicates to the operator to reposition a bucket 68. A computer included in the gorilla box 34 computes a vector "V" to the bucket 68 from the centimeter level accurate positions together with the tilt and the compass measurements and angles "A", "B" and "C".

Also in FIG. 3, a reference station 70 is shown that includes a GPS receiver 72 and a UHF telemetry transmitter 74 for communication with the antenna 66 and the processor unit gorilla box 54. The GPS receiver 72 has a fixed location that is precisely known and entered into the GPS receiver's memory. Differential corrections are calculated by the GPS receiver 72 and forwarded to the UHF transmitter 74 for local broadcast. Such reference station 70 is useful to provide telemetry information to the systems 10 and 30.

The locations of the GPS satellite antennas 20, 44 and 64 are selected to minimize the effects of shock and vibration, to sit back in a protected position safe from materials injury, and yet exposed to the sky well enough to receive signals from a constellation of orbiting GPS satellites. The prior art has suggested the use of a mast, but the moment arm of such masts tends to amplify vibrations and the top end of the mast places the GPS antenna in a very vulnerable position.

The GPS processor units are enclosed in so-called "gorilla boxes" 14, 34 and 54, for harsh, exposed to the weather and oil-spray service, commonly referred to as NEMA type-4. As such, humidity, condensation, driving rain, aggravated blowing sand and dust, mechanical shock, sine vibration and random vibration must be provided for. Preferably, positive cooling is included, such as a semiconductor Peltier cooling device attached between internal and external heat sinks for moderating the temperature inside the gorilla boxes 14, 34 and 54. There must be no sharp corners. Detachable and weldable brackets for top, back, and bottom mounting are preferably included. Cable connections, e.g., to the displays, sensors and antennas, are preferably protected from damage by being recessed or routed through "dog houses" that have separate compartments. Vibration isolators are required to minimize any shock that reaches the internal GPS processor units. The processor units receive position updates from the OTF-RTK GPS navigation receivers and provide for a real-time differencing of the position determinations from a predetermined position model plan for a bulldozer, pile driver, shovel, airplane, etc. The processor unit is preferred to include, at minimum, a type-486/25 CPU, a PCMCIA board, a VGA display driver, and expansion slots for memory and I/O.

Each of the systems 10, 30 and 50 preferably operate in real-time kinematic (RTK) mode, wherein centimeter-level accurate updates are provided at least twice a second on the respective displays 16, 36, and 56. A single reference base station is required that can transmit to one or all of the systems 10, 30, and 50, e.g., on a UHF frequency of 900 MHz. Such reference base station conventionally comprises a GPS receiver fixed at a known precisely surveyed-in location, and with that location determination dialed in to GPS receiver database. The UHF telemetry transmitter is connected to transmit local differential correction information to the antennas 22, 46, and 66. Such radio telemetry may conventionally output data messages at 4800 baud. A limitless number of mobiles can make use of such correction signals.

The GPS antennas 20, 44, and 64 must be mounted so there is an unobstructed view to the orbiting GPS satellites. When each system's GPS receiver is powered up, such GPS receiver searches for and locks onto as many satellites it can receive, e.g., a maximum of nine. This takes approximately two to three minutes from a cold start. The telemetry receivers pass the base station correction messages to the GPS receiver twice per second and immediately the system is operating in differential GPS mode, for sub-meter accuracy. Each mobile GPS receiver then carries out an initialization on-the-fly (OTF) to improve accuracy to centimeter level. This typically takes one more minute to initialize.

Figure 4:
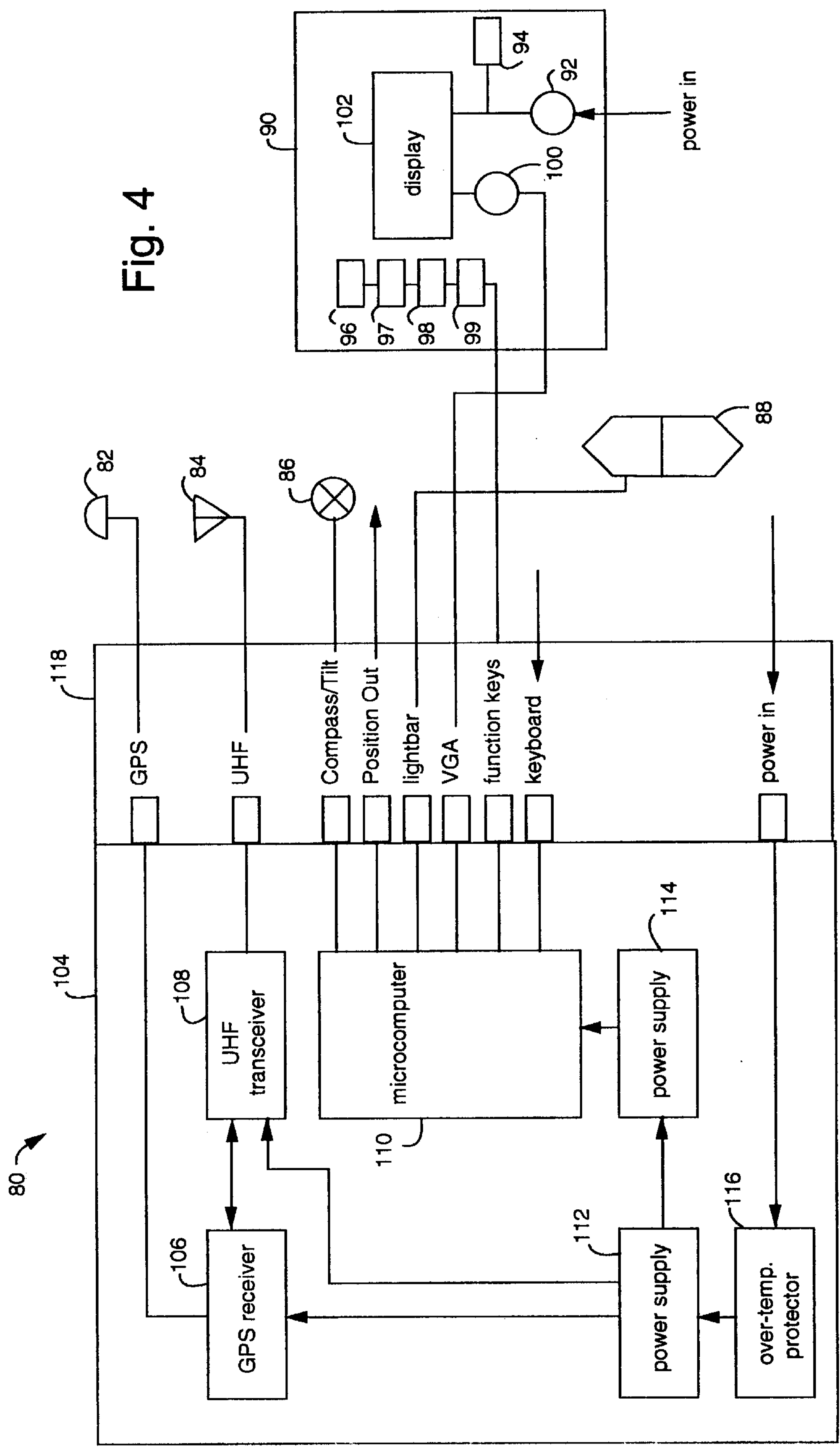
FIG. 4 is a modular machine guidance control system embodiment of the present invention.

In FIG. 4, a modular machine guidance control system 80 is similar to those shown in FIGS. 1–3. The system 80 comprises a dual-frequency GPS antenna and low-noise amplifier (LNA) 82 for microwave reception of transmissions from orbiting GPS satellites, a UHF antenna 84 for reception of telemetry transmissions from local reference stations transmitting differential corrections and predetermined position model plans from a work control center, and a combination compass and tilt sensor 86 for determining the attitude and heading of a mobile unit that the system 80 is attached to. A lightbar 88 provides a two-dimensional indication to an equipment operator or airplane pilot to guide the heavy equipment or airplane up/down or left/right to maneuver according to the predetermined model plan. A video display unit 90 has an on/off button 92, a Peltier heater/cooler 94, a set of four function keys 96–99, a contrast control 100 and a transflective LCD display 102. The video display 90 allows an operator or pilot to setup the guidance mode and to be instructed by it. A gorilla box housing 104 is a NEMA type-4 enclosure with a GPS receiver 106 connected to a UHF radio telemetry transceiver 108, a microcomputer 110, and a (9–32 VDC to 12 VDC) power supply 112. A (12 VDC to 5 VDC) power supply 114 is provided to power the microcomputer 110. A CPU over-temperature protector 116 disconnects power to the other components if the internal temperatures of the housing 104 exceed the safe operating temperatures of any one of the GPS receiver 106, UHF receiver 108, or microcomputer 110. A "dog-house" compartment 118 with built-in strain reliefs provides a protected area within which to connect cables to the system 80.

In an alternative embodiment, the UHF radio 108 is a transceiver that reports the position of system 80 to a central dispatch office, or mining control office, for example.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A guidance system for attachment and use on an earth grading equipment machinery, comprising:

a rough-service box for mounting to the earth grading equipment machinery and in which are disposed and interconnected a telemetry receiver, a first global positioning system (GPS) navigation receiver, and a processor unit connected to an operator display;

a dual-frequency GPS antenna connected to said first GPS navigation receiver placed in a position protected from injury and for receiving spread spectrum microwave radio frequency transmissions from orbiting navigation satellites;

an antenna connected to the telemetry receiver and that provides telemetry signals that include differential correction, real-time kinematic, and machine control information;

a position/angle sensor connected to measure the relative angular position "A" of a mechanism on said earth grading equipment machinery;

a tilt sensor connected to measure the relative angular tilt "T" of said earth grading equipment machinery;

a compass connected to measure the relative compass heading of said earth grading equipment machinery; and a reference station that includes a second GPS receiver and a telemetry transmitter for communication with said telemetry receiver, and said second GPS receiver has a fixed location that is precisely known and entered to produce differential corrections that are forwarded to the telemetry transmitter for local broadcast and use by said first GPS receiver;

wherein, said first GPS navigation receiver provides centimeter level accurate positions of the GPS antenna in real-time;

wherein, said processor unit is connected to receive position updates from said first GPS navigation receiver and provides real-time differencing of position determinations from a predetermined position model plan; and wherein, a vector "V" from the GPS antenna to said mechanism is computed from said centimeter level accurate positions, said relative angular tilt "T", said compass heading, and said relative angular position "A", and at a frequency sufficient to guide an operator of said earth grading equipment machinery to raise or lower said mechanism.

* * * * *